United States Patent
Tanaka et al.

(10) Patent No.: US 12,315,528 B2
(45) Date of Patent: May 27, 2025

(54) FILTERING METHOD, FILTERING DEVICE, AND STORAGE MEDIUM STORED WITH FILTERING PROGRAM

(71) Applicant: YAMAHA CORPORATION, Hamamatsu (JP)

(72) Inventors: Ryo Tanaka, Hamamatsu (JP); Satoshi Ukai, Hamamatsu (JP)

(73) Assignee: YAMAHA CORPORATION, Hamamatsu (JP)

( * ) Notice: Subject to any disclaimer, the term of this patent is extended or adjusted under 35 U.S.C. 154(b) by 0 days.

(21) Appl. No.: 17/386,631

(22) Filed: Jul. 28, 2021

(65) Prior Publication Data

US 2022/0036910 A1 Feb. 3, 2022

(30) Foreign Application Priority Data

Jul. 30, 2020 (JP) .................. 2020-129083

(51) Int. Cl.
| | |
|---|---|
| *G10L 21/0324* | (2013.01) |
| *H04R 3/00* | (2006.01) |
| *H04R 3/04* | (2006.01) |
| *H04R 5/04* | (2006.01) |
| *H04S 1/00* | (2006.01) |
| *H04S 7/00* | (2006.01) |

(52) U.S. Cl.
CPC .......... *G10L 21/0324* (2013.01); *H04R 3/005* (2013.01); *H04R 3/04* (2013.01); *H04R 5/04* (2013.01); *H04S 1/007* (2013.01); *H04S 7/307* (2013.01)

(58) Field of Classification Search
CPC ....... G10L 21/0324; H04R 3/005; H04R 3/04; H04R 5/04; H04S 1/007; H04S 7/307
See application file for complete search history.

(56) References Cited

U.S. PATENT DOCUMENTS

| | | | | |
|---|---|---|---|---|
| 5,473,701 A | * | 12/1995 | Cezanne | H04R 1/406 381/92 |
| 5,473,702 A | * | 12/1995 | Yoshida | H04R 3/005 381/94.6 |
| 5,627,896 A | * | 5/1997 | Southward | G10K 11/17854 381/71.11 |
| 9,202,475 B2 | * | 12/2015 | Elko | H04R 25/453 |

(Continued)

FOREIGN PATENT DOCUMENTS

| | | |
|---|---|---|
| JP | 2001100800 A | 4/2001 |
| WO | 2007018293 A1 | 2/2007 |

OTHER PUBLICATIONS

Mitra, Sanjit K., "Digital Signal Processing", 2001, McGraw-Hill Irwin, Second Edition, ix-xii, pp. 204-205, and pp. 552-553. (Year: 2001).*

(Continued)

*Primary Examiner* — Daniel R Sellers
(74) *Attorney, Agent, or Firm* — ROSSI, KIMMS & McDOWELL LLP

(57) ABSTRACT

A filtering method includes: receiving a first audio signal and a second audio signal that include sound emitted from a same sound source at different volumes; generating a filter signal by convoluting adaptive filter coefficients into the second audio signal; removing components of the filter signal from the first audio signal; and limiting a gain of the adaptive filter coefficients to 1.0 or less.

11 Claims, 8 Drawing Sheets

(56) References Cited

U.S. PATENT DOCUMENTS

| | | | | |
|---|---|---|---|---|
| 10,789,933 | B1* | 9/2020 | Li | H03H 21/0027 |
| 2003/0040908 | A1* | 2/2003 | Yang | H04R 3/005 |
| | | | | 704/233 |
| 2008/0250090 | A1* | 10/2008 | Eitel | H03H 21/0012 |
| | | | | 708/308 |
| 2009/0055170 | A1 | 2/2009 | Nagahama | |
| 2015/0213811 | A1* | 7/2015 | Elko | H04R 3/005 |
| | | | | 381/92 |
| 2016/0142815 | A1* | 5/2016 | Norris | G10L 21/0216 |
| | | | | 381/92 |
| 2020/0219493 | A1 | 7/2020 | Li | |

OTHER PUBLICATIONS

Extended European Search Report issued in European Application No. 21188168.5 mailed Dec. 14, 2021.
Office Action issued in European Appln. No. 21188168.5, mailed Nov. 23, 2023.
Office Action issued in Japanese Appln. No. 2020-129083 mailed Apr. 23, 2024. English translation provided.

* cited by examiner

FILTERING METHOD, FILTERING DEVICE, AND STORAGE MEDIUM STORED WITH FILTERING PROGRAM

CROSS REFERENCE TO RELATED APPLICATIONS

This Nonprovisional application claims priority under 35 U.S.C. § 119(a) on Patent Application No. 2020-129083 filed in Japan on Jul. 30, 2020, the entire contents of which are hereby incorporated by reference.

BACKGROUND

Technical Field

The present disclosure relates to a filtering method for filtering an audio signal.

Background Information

In the past, there have been suggested sound separation devices that eliminate noise and separate a speaker's voice (target sound) from an audio signal. For example, Japanese Patent Application Publication 2001-100800 discloses a method for eliminating noise by spectral subtraction.

However, when both the target sound and the noise are voices, it is difficult to separate the target sound only by spectral subtraction as disclosed in Japanese Patent Application Publication No. 2001-100800.

International Patent Application Publication No. WO2007-18293A1 discloses a sound separation device that can separate target sound even when both the target sound and the noise are voices. The sound separation device disclosed in International Patent Application Publication No. WO2007-18293A1 calculates the respective power spectrums of a plurality of audio source signals and calculates the power spectrum difference. The sound separation device adjusts the level of each frequency component of each of the audio source signals with a gain based on the calculated power spectrum difference.

SUMMARY

In the method disclosed in International Patent Application Publication No. WO2007-18293A1, non-linear processing, in which different frequency components of each audio source signal are multiplied by different gains, is performed. This method disclosed in International Patent Application Publication No. WO2007-18293A1 may cause a great distortion of the spectrum and may result in severe deterioration of the audio quality. In addition, the method disclosed in International Patent Application Publication No. WO2007-18293A1 deteriorates the accuracy of signal processing based on the envelope (for example, voice recognition processing).

An object of an embodiment of the present disclosure is to provide a filtering method that can separate target sound without causing a distortion of the spectrum.

A filtering method according to an embodiment of the present disclosure includes: receiving a first audio signal and a second audio signal that include sound emitted from a same sound source at different volumes generating a filter signal by convoluting adaptive filter coefficients into the second audio signal removing components of the filter signal from the first audio signal; and limiting a gain of the adaptive filter coefficients to 1.0 or less.

The embodiment of the present disclosure makes it possible to separate target sound without causing a distortion of the spectrum.

DETAILED DESCRIPTION

Figure 1:
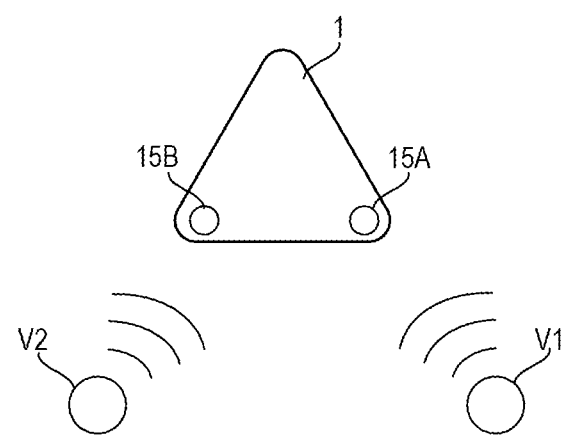
FIG. 1 is a schematic external view of a sound pickup device 1.

FIG. 1 is a schematic external view of a sound pickup device 1. The sound pickup device 1 includes a microphone 15A and a microphone 15B. The microphones 15A and 15B individually pick up the surrounding sounds. In the example shown in FIG. 1, the microphone 15A and the microphone 15B are to pick up the voice of a speaker V1 and the voice of another speaker V2, respectively.

Figure 2:
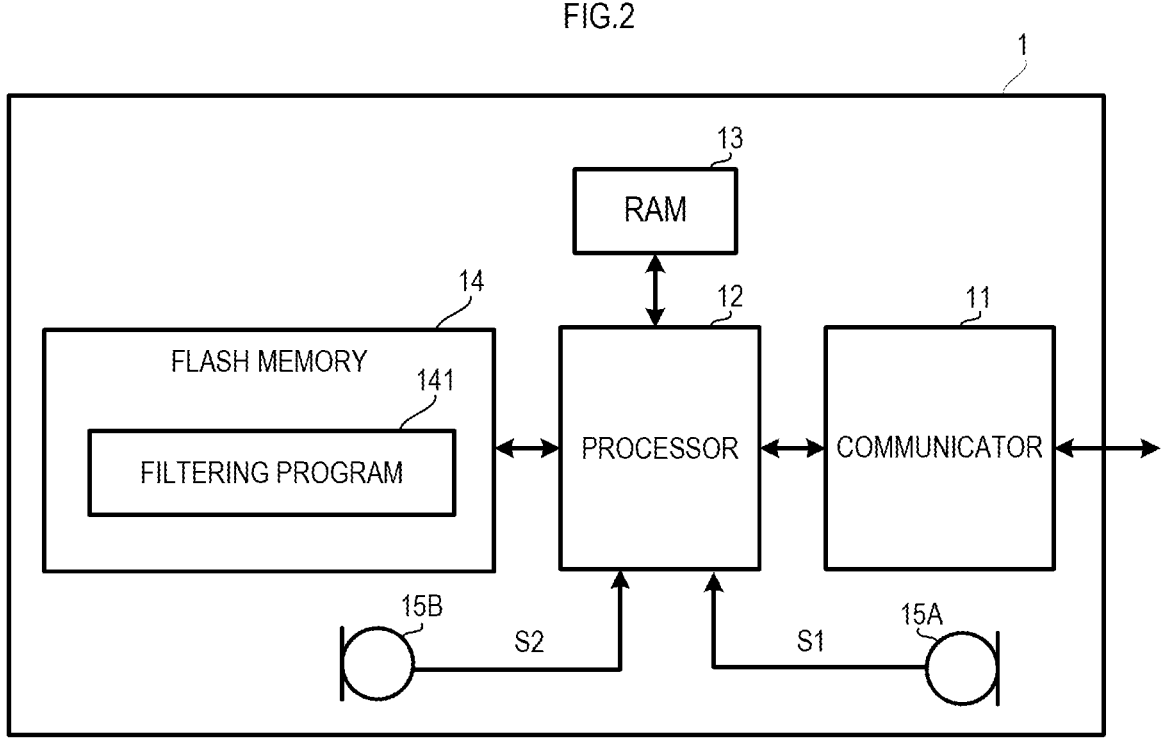
FIG. 2 is a block diagram showing the configuration of the sound pickup device 1.

FIG. 2 is a block diagram showing the configuration of the sound pickup device 1. The sound pickup device 1 includes a communicator 11, a processor 12, a RAM 13, a flash memory 14, a microphone 15A, and a microphone 15B.

The sound pickup device 1 is an example of a filtering device according to the present disclosure. The sound pickup device 1 filters the audio signals caught by the microphones 15A and 15B. In FIG. 1, the audio signal caught by the microphone 15A includes the voice of the speaker V1 and the voice of the speaker V2. Similarly, the audio signal caught by the microphone 15B includes the voice of the speaker V1 and the voice of the speaker V2.

The microphone 15A is placed near the speaker V1, and the microphone 15B is placed near the speaker V2. Accordingly, the microphone 15A picks up a greater volume (a higher level) of the voice of the speaker V1 than the voice of the speaker V2. The microphone 15B picks up a higher level of the voice of the speaker V2 than the level of the voice of the speaker V1. Thus, the audio signal caught by the microphone 15A and the audio signal caught by the microphone 15B include sounds from the same sound sources, but the volumes of the sounds included in the respective audio signals are different.

The sound pickup device 1 filters the audio signal caught by the microphone 15A to remove the components of the voice of the speaker V2, which are on low levels, from the audio signal. In addition, the sound pickup device 1 filters the audio signal caught by the microphone 15B to remove the components of the voice of the speaker V1, which are on low levels, from the audio signal.

The sound pickup device 1 sends the filtered audio signal to another device, for example, via the communicator 11. The sound pickup device 1 may further include a speaker. In this case, the speaker emits sound in accordance with an audio signal that the speaker received from another device via the communicator 11. In this case, for example, the sound pickup device 1 works as a telecommunication device that is connected to other devices located in distant places to send and receive audio data to and from the devices in distant places.

The processor 12 can perform various kinds of processing by reading programs from a flash memory 14 (a storage medium) and storing the programs temporarily on the RAM 13. Such programs include a filtering program 141. The flash memory 14 additionally stores operation programs, such as firmware, etc., for operating the processor 12. The programs to be read by the processor 12 are not necessarily stored in the flash memory 14 in the sound pickup device 1 itself. For example, the programs may be stored in a storage medium in an external device such as a server or the like. In this case, the processor 12 reads a program from the server and stores the program on the RAM 13 to perform the processing when necessary.

The microphone 15A catches a first audio signal S1, and the microphone 15B catches a second audio signal S2. The microphones 15A and 15B convert the audio signals into digital signals and output the digital signals to the processor 12.

Figure 3:
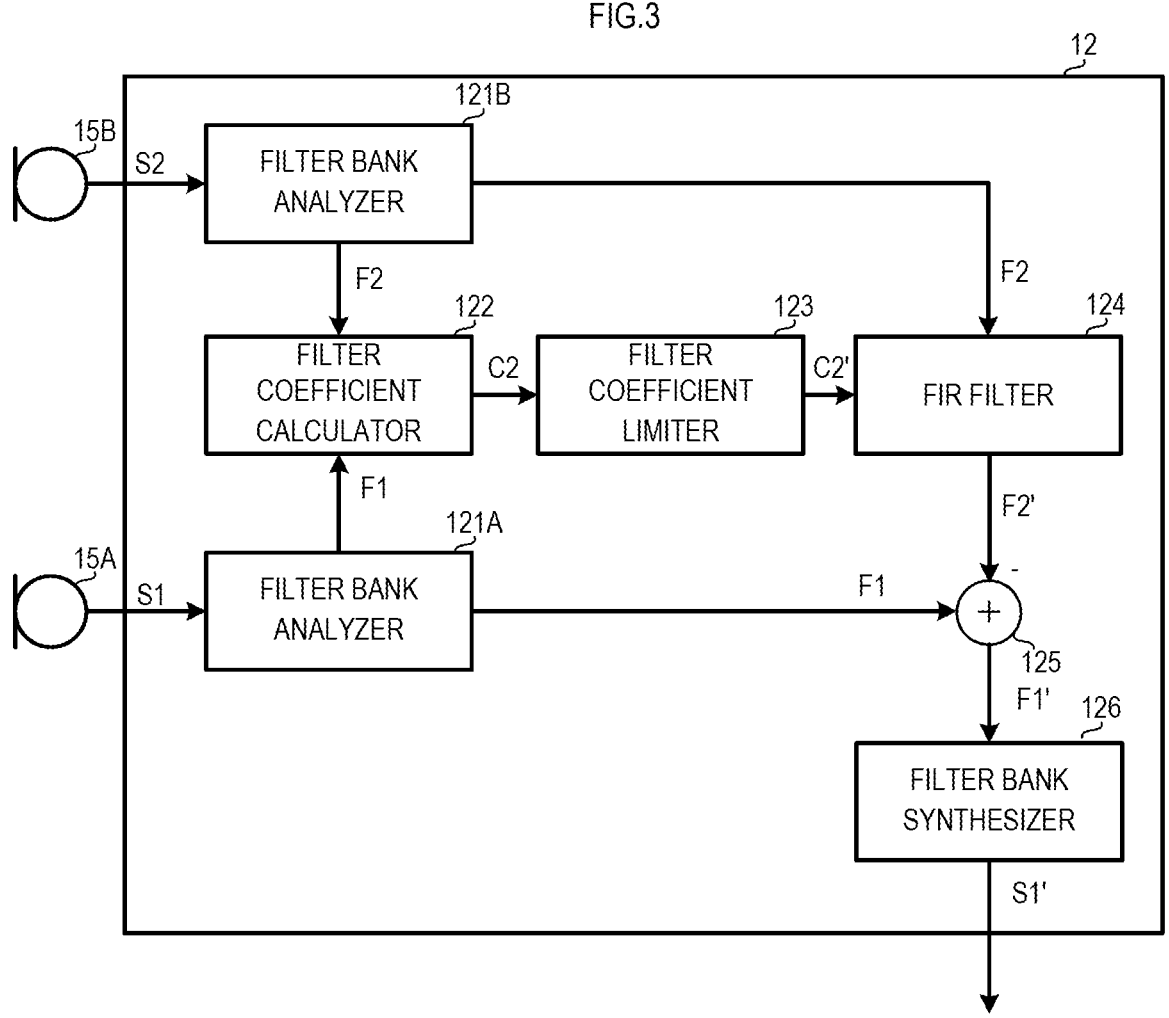
FIG. 3 is a block diagram showing the functional configuration of a processor 12.
Figure 4:
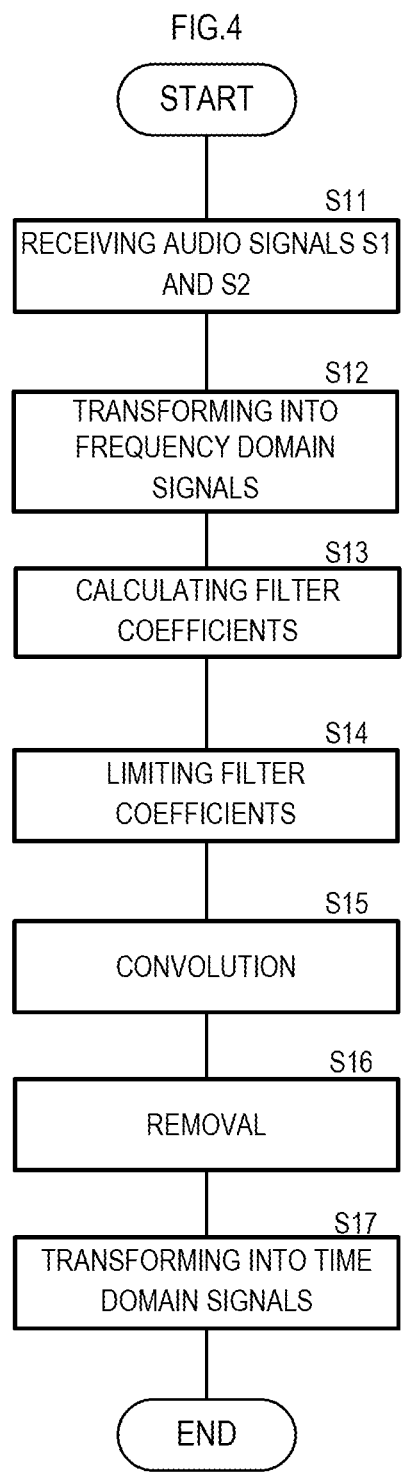
FIG. 4 is a flowchart showing a filtering procedure.

The processor 12 filters the audio signal S1 caught by the microphone 15A and the audio signal S2 caught by the microphone 15B. FIG. 3 is a block diagram showing the functional configuration of the processor 12. FIG. 4 is a flowchart showing a procedure for the filtering.

The processor 12 functionally includes a filter bank analyzer 121A, another filter bank analyzer 121B, a filter coefficient calculator 122, a filter coefficient limiter 123, a FIR (finite impulse response) filter 124, an adder 125, and a filter bank synthesizer 126. These functions are implemented by the filtering program 141.

First, the processor 12 receives the audio signal S1 caught by the microphone 15A and the audio signal S2 caught by the microphone 15B (S11). Thus, the processor 12 functions as a receiver. As described above, each of the audio signal S1 caught by the microphone 15A and the audio signal caught by the microphone 15B includes the voice of the speaker V1 and the voice of the speaker V2.

The filter bank analyzer 121A transforms the audio signal S1 caught by the microphone 15A into an audio signal F1 with respect to frequency and extracts various frequency components separately (S12). Similarly, the filter bank analyzer 121B transforms the audio signal S2 caught by the microphone 15B into an audio signal F2 with respect to frequency and extracts various frequency components separately (S12).

The filter coefficient calculator 122 calculates filter coefficients C2 to be used in the FIR filter 124 (S13). The filter coefficients C2 are coefficients expressed by complex numbers by which the frequency components of the audio signal F2 are to be multiplied respectively in the FIR filter 124.

The filter coefficient limiter 123 limits the gains to be achieved by the filter coefficients C2 calculated by the filter coefficient calculator 122 to 1.0 or less (S14), thereby calculating corrected filter coefficients CT. In this way, the filter coefficient limiter 123 prevents the frequency components of the audio signal F2 from being amplified.

The FIR filter 124 convolutes the corrected filter coefficient C2' into the audio signal F2, thereby generating a filter signal FT (S15). The filter coefficients C2 are updated by the filter coefficient calculator 122, and accordingly, the corrected filter coefficients CT are updated. Thus, the FIR filter 124 functions as an adaptive filter.

The adder 125 subtracts the filter signal F2' from the audio signal F1, thereby removing the components of the filter signal F2' from the audio signal F1 (S16). The adder 125 outputs an audio signal F1' obtained by the subtraction. The adder 125 corresponds to an eliminator of the present disclosure.

The filter bank synthesizer 126 transforms the audio signal F1' into an audio signal S1' with respect to time (S17).

The filter coefficient calculator 122 receives the audio signal F2 and the audio signal F1. The filter coefficient calculator 122 updates the filter coefficients by using a specified algorithm, such as LMS (least mean squares) or the like. The filter coefficient calculator 122 generates an update filter signal by convoluting the filter coefficients C2 into the audio signal F2. The filter coefficient calculator 122 subtracts the update filter signal from the audio signal F1. The resultant signal is referred to as a reference signal. The filter coefficient calculator 122 updates the filter coefficients C2 to values that minimize the level of the reference signal. As the time passes, the calculated filter coefficients C2 are updated so that the update filter signal can remove the voice of the speaker V2 from the audio signal F1. Accordingly, the corrected filter coefficients C2' used in the FIR filter 124 are updated so that the filter signal F2' can remove the voice of the speaker V2 from the audio signal F1.

Both the audio signal F1 and the audio signal F2 include the voice of the speaker V1. The filter coefficient calculator 122 calculates filter coefficients C2 that minimize the level of the reference signal, and therefore, the filter coefficients C2 are updated to values that remove not only the voice of the speaker V2 but also the voice of the speaker V1 from the audio signal F1. However, the level of the voice of the speaker V1 in the audio signal F1 is higher than the level of the voice of the speaker V2 in the audio signal F1. Therefore, the filter coefficient calculator 122 calculates coefficients having gains of 1.0 or more, which will reduce the voice of the speaker V1 in the audio signal F1.

On the other hand, the filter coefficient limiter 123 limits the gains to be achieved by the filter coefficients to 1.0 or less. Accordingly, the level of the voice of the speaker V1 in the filter signal F2' is lower than the level of the voice of the speaker V1 in the audio signal F1. Therefore, the voice of the speaker V1 in the audio signal F1 is not completely removed by the filter signal F2' and remains in the audio signal F1'.

In this way, the processor 12 removes the voice of the speaker V2 as noise components and separates the voice of the speaker V1 as the target sound.

In order to remove the voice of the speaker V2 and not remove the voice of the speaker V1 from the audio signal F1, it is preferred that the filter coefficient calculator 122 updates the filter coefficients only when the level of the voice of the speaker V2 in the audio signal F2 is high. In other words, when the level of the voice of the speaker V2 in the audio signal F2 is low, it is preferred that the filter coefficients are not updated. Therefore, the filter coefficient calculator 122 may update the filter coefficients C2 for only the frequency components in which the volume ratio of the audio signal F2 to the audio signal F1 (F2/F1) excesses a predetermined threshold.

The threshold may be any value. For example, when the threshold is 1.0, the filter coefficient calculator 122 updates the filter coefficients C2 for only the frequency components in which the level of the audio signal F2 is higher than the level of the audio signal F1. Accordingly, in the case where the threshold is 1.0, only when the sound viewed as a noise component is picked up by the microphone 15B at a higher level than the level of the sound picked up by the microphone 15A, the processor 12 calculates a filter coefficient that removes the sound. In the case where the threshold is greater than 1.0 (for example, about 1.5), only when the sound viewed as a noise component to be removed is at a still higher level, the processor 12 updates the filter coefficient. With this arrangement, updates of the filter coefficients are performed based on the audio signal F1 and the voice of the speaker V2, and the updates are unlikely to be affected by external noise. This heightens the accuracy of the filter coefficients and enhances the filtering effect. Thus, by setting the threshold to an arbitrary value greater than 1.0 depending on how much the voice of the speaker V2, which should be removed, is mixed in the audio signal, the effect of removing the sound viewed as noise components can be set arbitrarily.

The audio signal S2 picked up by the microphone 15B is subjected to the same processing. The processor 12 subtracts a filter signal generated from the audio signal S1 from the audio signal F2 obtained by frequency transformation of the audio signal S2. Thereby, the voice of the speaker V1 is removed, and the voice of the speaker V2 is separated as the target sound.

In this way, even when the speakers V1 and V2 speak at the same time, the sound pickup device 1 with the above-described structure can separate the picked-up sound into the voice of the speaker V1 and the voice of the speaker V2.

The sound pickup device 1 according to the present embodiment separates target sound from an audio signal by performing linear processing, specifically subtracting a filter signal outputted from an adaptive filter from the audio signal. Therefore, the sound pickup device 1 can separate target sound without distorting the spectrum of the audio signal.

The envelope of a spectrum relates to the characteristics of a person's vocal tract and is significantly important for voice recognition processing. Therefore, the separation of target sound according to the present embodiment is suited to be used for voice recognition processing.

Figure 5:
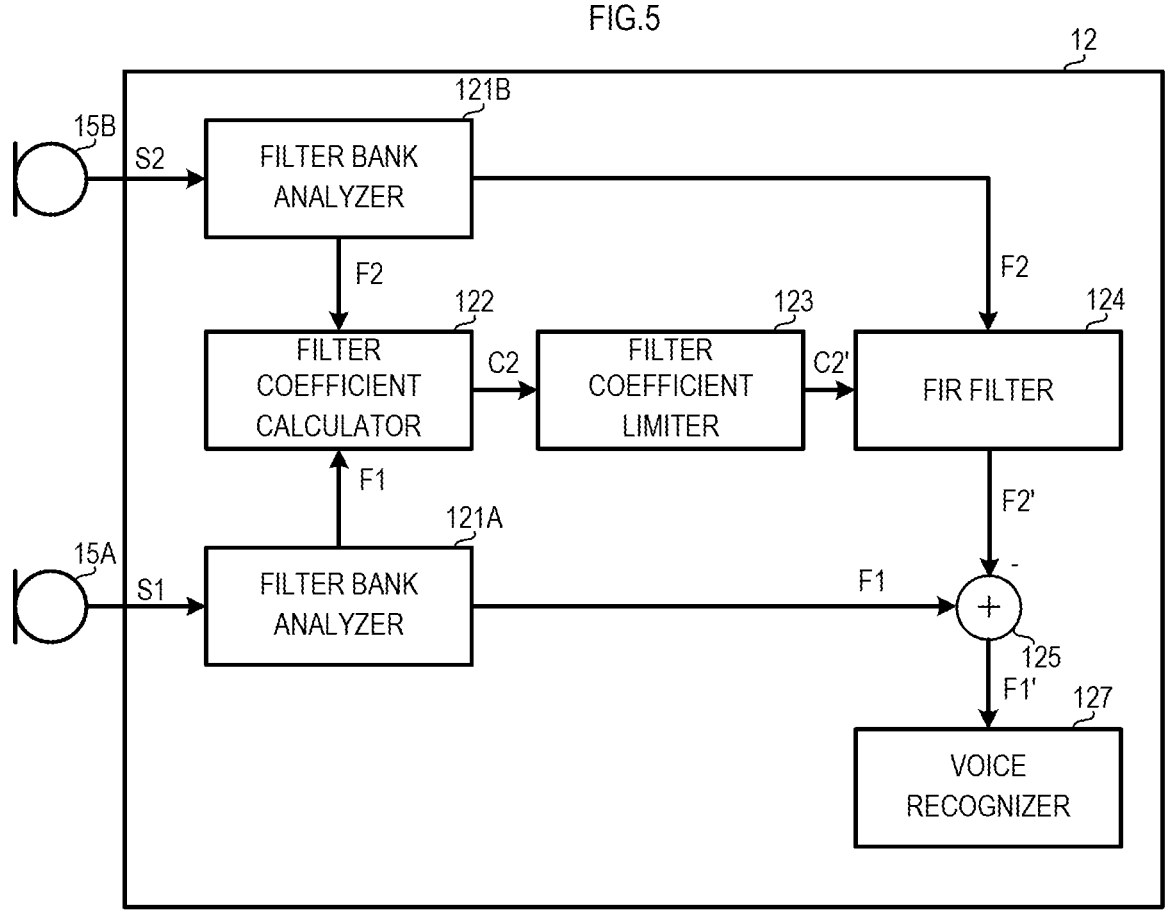
FIG. 5 is a block diagram showing the functional configuration of the processor 12 when the processor 12 additionally performs voice recognition processing.

FIG. 5 is a block diagram showing the functional configuration of the processor 12 when the processor 12 additionally performs voice recognition processing. The processor 12 shown in FIG. 5 further includes a voice recognizer 127. There are no other differences between the functional configuration of the processor 12 shown in FIG. 5 and the functional configuration shown by the block diagram in FIG. 3.

The voice recognizer 127 performs voice recognition based on an output signal from the adder 125. In other words, the voice recognizer 127 performs voice recognition by using the audio signal F1' into which the voice of the speaker V1 is extracted. As described above, the sound pickup device 1 according to the present embodiment separates the voice of the speaker V1 by linear processing, and this processing does not cause a distortion of the envelope of the spectrum. Therefore, the accuracy of voice recognition performed by the voice recognizer 127 is improved.

However, in a case in which the filtered audio signal is sent to another device in a distant place so that a listener in the distant place can listen to the sound, the processor 12 may perform non-linear processing.

Figure 6:
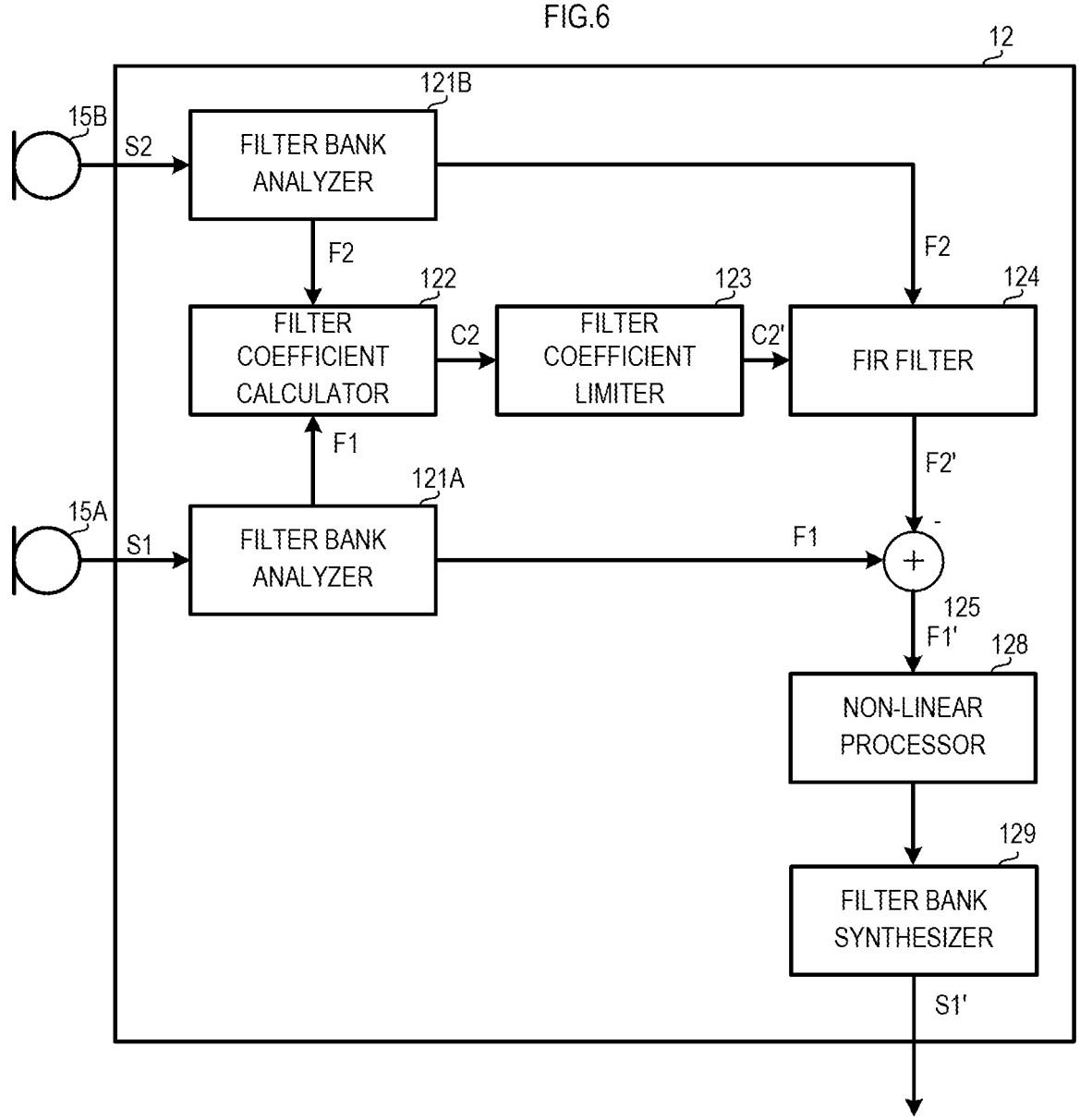
FIG. 6 is a block diagram of the functional configuration of the processor 12 when the processor 12 additionally performs non-linear processing.

FIG. 6 is a block diagram showing the functional configuration of the processor 12 when the processor 12 performs non-linear processing. The processor 12 shown in FIG. 6 further includes a non-linear processor 128. There are no other differences between the functional configuration of the processor 12 shown in FIG. 6 and the functional configuration shown by the block diagram in FIG. 3.

The non-linear processor 128 performs non-linear processing of the output signal from the adder 125. The non-linear processing may be any kind of processing. The non-linear processing is processing to remove the frequency components of a filter signal F2' from the audio signal F1' by spectrum subtraction or Wiener filtering. Alternatively, the non-linear processing may be processing to remove echo components from the audio signal F1' by spectrum subtraction or Wiener filtering. Alternatively, the non-linear processing may be processing to remove steady noise components from the audio signal F1' by spectrum subtraction or Wiener filtering. In this way, the non-linear processor 128 performs processing, for example, to emphasize the voice of the speaker V1.

Figure 7:
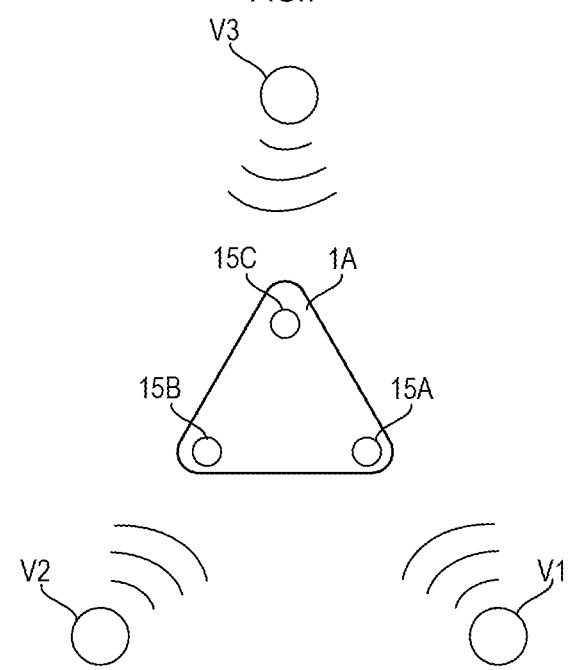
FIG. 7 is a schematic external view of a sound pickup device 1A according to a modification.

FIG. 7 is a schematic external view of a sound pickup device 1A according to a modification. The sound pickup device 1A further includes another microphone 15C. The sound pickup device 1A has no other differences in structure from the sound pickup device 1. In the example shown in FIG. 7, the microphone 15A, the microphone 15B and the microphone 15C are to pick up the voice of the speaker V1, the voice of the speaker V2 and the voice of another speaker V3, respectively. The microphone 15C catches an audio signal S3. The audio signal S3 caught by the microphone 15C includes the voice of the speaker V1, the voice of the speaker V2 and the voice of the speaker V3. However, the audio signal S3 includes the voice of the speaker V3 at a higher level than the voice of the speaker V1 and the voice of the speaker V2.

Figure 8:
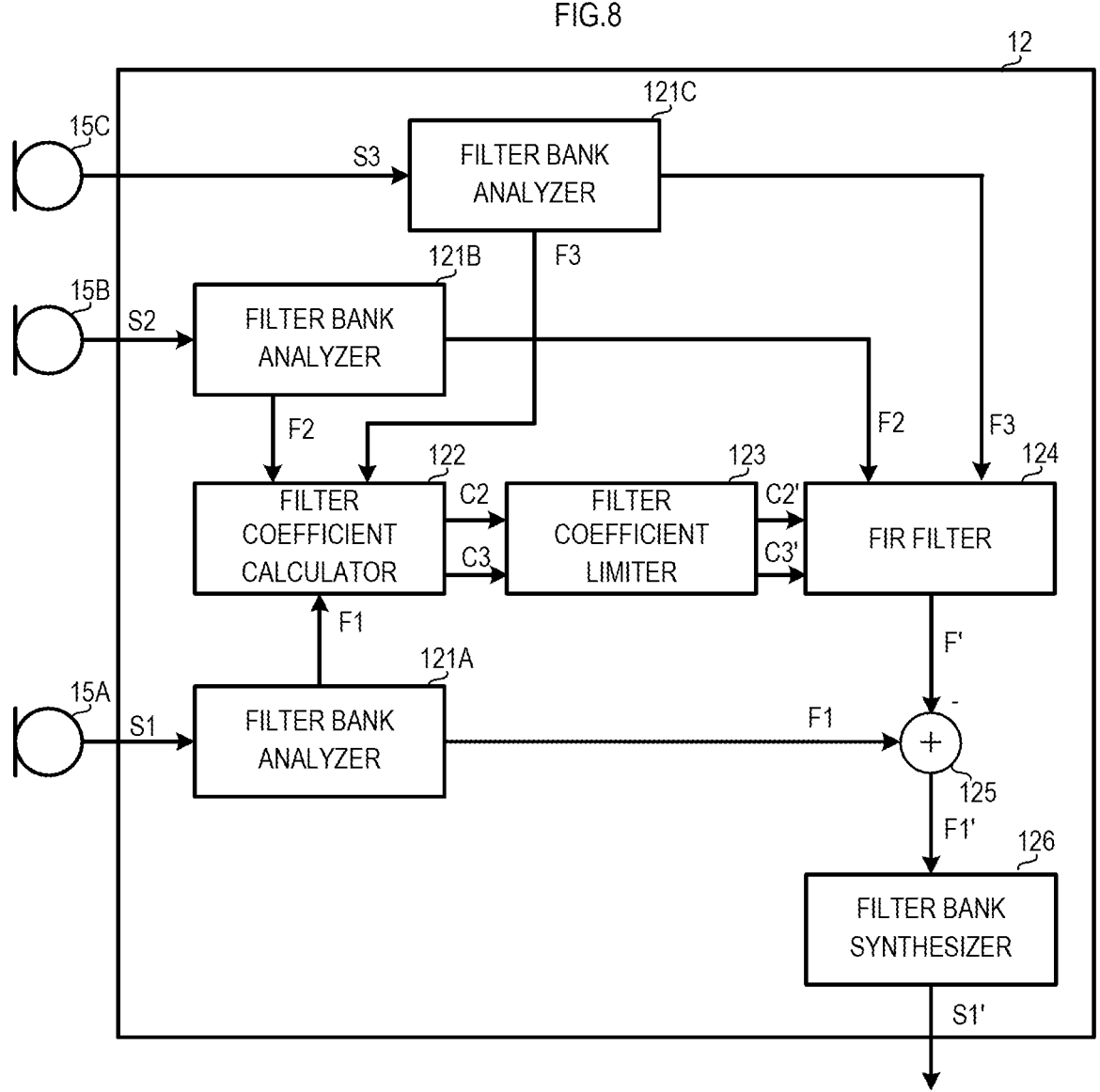
FIG. 8 is a block diagram showing the functional configuration of the processor 12 when an audio signal S3 is additionally received.

FIG. 8 is a block diagram showing the functional configuration of the processor 12 when the processor 12 additionally receives the audio signal S3. The processor 12 further includes another filter bank analyzer 121C. The filter bank analyzer 121C transforms the audio signal S3 into an audio signal F3 with respect to frequency and extracts frequency components separately.

The filter coefficient calculator 122 calculates filter coefficients to be used in the FIR filter 124, based on the audio signals F2 and F3. In this example, the filter coefficient calculator 122 calculates filter coefficients C2 and filter coefficients C3. The filter coefficient limiter 123 limits the gains to be achieved by the filter coefficients C2 and the filter coefficients C3 to 1.0 or less (S14), thereby calculating corrected filter coefficients C2' and corrected filter coefficients C3'. The FIR filter 124 convolutes the corrected filter coefficients C2' and the corrected filter coefficients C3' into the audio signal F2 and the audio signal F3, respectively, thereby generating a filter signal F'. More specifically, the filter signal F' is the sum of the result of the convolution of the corrected filter coefficients C2' into the audio signal F2 and the result of the convolution of the corrected filter coefficients C3' into the audio signal F3 (F2*C2'+F3'*C3').

The level of the voice of the speaker V1 in the audio signal S2 is lower than the level of the voice of the speaker V1 in the audio signal S1. Similarly, the level of the voice of the speaker V1 in the audio signal S3 is lower than the level of the voice of the speaker V1 in the audio signal S1. Therefore, the filter coefficient calculator 122 calculates filter coefficients C2 and C3 having gains of 1.0 or more, which will reduce the voice of the speaker V1 in the audio signal S1. However, the filter coefficient limiter 123 limits the gains to be achieved by the filter coefficients C2 and the filter coefficients C3 to 1.0 or less. Accordingly, the voice of the speaker V2 and the voice of the speaker V3 are removed from the audio signal S1, and the voice of the speaker V1 is separated.

The audio signal S2 and the audio signal S3 are subjected to the same processing. The voice of the speaker V1 and the voice of the speaker V3 are removed from the audio signal S2, and the voice of the speaker V2 is separated. The voice of the speaker V1 and the voice of the speaker V2 are removed from the audio signal S3, and the voice of the speaker V3 is separated.

Even when there are more audio signals, the audio signals are subjected to the same processing. When the second signal includes a number N of audio signals, a number N of kinds of filter coefficients are calculated. A filter signal is calculated by summing the results of respective convolutions of the number N of kinds of filter coefficients into the number N of audio signals (F1*C1'+F2*C2'+ . . . +FN*CN'). From each of the number N of audio signals, the sound included therein at the highest level is separated.

In this way, when still more speakers speak at the same time and a plurality of microphones catch audio signals including the speakers' voices, the processor 12 can set the voice of the speaker who is the nearest to each microphone as target sound and separate the speaker's voice from the audio signal caught by the microphone.

It should be understood that the present embodiment has been described as an example and that the description is not limiting. The scope of the present disclosure is not limited to the embodiment and modifications above and is determined by the claims. Further, the scope of the disclosure shall be deemed to include equivalents of the scope of the claims.

For example, in the embodiment described above, the filter coefficients C2' are convoluted into the frequency domain signal F2; the resultant signal of the convolution is subtracted from the audio signal F1, whereby the audio signal F1' is obtained; and the audio signal F1' is transformed into a time domain signal. However, the FIR filter 124 may convolute filter coefficients into the time domain signal S2, thereby generating a time domain filter signal. In this case, the adder 125 subtracts the time domain filter signal from the audio signal S1. Still in this case, the filter coefficient calculator 122 receives the frequency domain signals F1 and F2 and calculate corrected filter coefficients C2 with respect to frequency. The filter coefficient limiter 123 limits the gains to be achieved by the filter coefficients C2 with respect to frequency to 1.0 or less. The gain-limited corrected filter coefficients C2' are transformed into filter coefficients with respect to time. The FIR filter 124 convolutes the filter coefficients with respect to time into the audio signal S2, whereby the time domain filter signal is generated.

What is claimed is:

1. A filtering method comprising:
  receiving a first audio signal and a second audio signal, wherein:
    the first audio signal represents first sound emitted from a first sound source and second sound emitted from a second sound source, a volume of the first sound from the first sound source being greater than a volume of the second sound from the second sound source in the first audio signal; and
    the second audio signal represents the first sound emitted from the first sound source and the second sound emitted from the second sound source, the volume of the second sound from the second sound source being greater than the volume of the first sound from the first sound source in the second audio signal;
  transforming the first audio signal to a first transformed audio signal with respect to frequency and the second audio signal to a second transformed audio signal with respect to frequency;
  calculating first filter coefficients with respect to frequency of a first FIR filter that minimize a level of a first reference signal based on the first and second transformed audio signals, the first FIR filter functioning as a first adaptive filter;
  calculating second filter coefficients with respect to frequency of a second FIR filter that minimize a level of a second reference signal based on the first and second transformed audio signals, the second FIR filter functioning as a second adaptive filter;
  limiting gains of the calculated first filter coefficients of the first FIR filter for each frequency component to 1.0 or less, in a state where the gains thereof exceed 1.0;
  limiting gains of the calculated second filter coefficients of the second FIR filter for each frequency component to 1.0 or less, in a state where the gains thereof exceed 1.0;
  generating a first filter signal by convoluting the calculated first filter coefficients of the first FIR filter into the second audio signal;
  generating a second filter signal by convoluting the calculated second filter coefficients of the second FIR filter into the first audio signal;
  generating the first reference signal by removing components of the first filter signal from the first audio signal;
  generating the second reference signal by removing components of the second filter signal from the second audio signal,
  wherein the first filter coefficients are expressed by complex numbers by which each frequency component of the second audio signal is to be multiplied respectively in the first FIR filter,
  wherein the second filter coefficients are expressed by complex numbers by which each frequency component of the first audio signal is to be multiplied respectively in the second FIR filter,
  wherein the calculating of the first filter coefficients of the first FIR filter updates the first filter coefficients of the first FIR filter in a state where a volume ratio of the second audio signal to the first audio signal exceeds a first predetermined threshold, and
  wherein the calculating of the second filter coefficients of the second FIR filter updates the second filter coefficients of the second FIR filter in a state where a volume ratio of the first audio signal to the second audio signal exceeds a second predetermined threshold.

2. The filtering method according to claim 1, further comprising:
  performing first voice recognition processing using the first reference signal; and
  performing second voice recognition processing using the second reference signal.

3. The filtering method according to claim 1, further comprising:
  performing first non-linear processing of the first reference signal; and
  performing second non-linear processing of the second reference signal.

4. The filtering method according to claim 1, wherein:
  the second audio signal includes a number N of kinds of second audio signals;
  the first filter coefficients of the first FIR filter include the same number N of kinds of first filter coefficients; and the first filter signal is generated by convoluting the number N of kinds of the first filter coefficients into the number N of second audio signals.

5. The filtering method according to claim 1, wherein:
the limiting gain of the calculated first filter coefficients limits the gain of each frequency component; and
the limiting gain of the calculated second filter coefficients limits the gain of each frequency component.

6. A filtering device comprising:
a processor configured to:
receive a first audio signal and a second audio signal, wherein:
the first audio signal represents first sound emitted from a first sound source and second sound emitted from a second sound source, a volume of the first sound from the first sound source being greater than a volume of the second sound from the second sound source in the first audio signal; and
the second audio signal represents the first sound emitted from the first sound source and the second sound emitted from the second source, the volume of the second sound from the second sound source being greater than the volume of the first sound from the first sound source in the second audio signal;
transform the first audio signal to a first transformed audio signal with respect to frequency and the second audio signal to a second transformed audio signal with respect to frequency;
calculate first filter coefficients with respect to frequency of a first FIR filter that minimize a level of a first reference signal based on the first and second transformed audio signals, the first FIR filter functioning as a first adaptive filter;
calculate second filter coefficients with respect to frequency of a second FIR filter that minimize a level of a second reference signal based on the first and second transformed audio signals, the second FIR filter functioning as a second adaptive filter;
limit gains of the calculated first filter coefficients of the first FIR filter for each frequency component to 1.0 or less, in a state where the gains thereof exceed 1.0;
limiting gains of the calculated second filter coefficients of the second FIR filter for each frequency component to 1.0 or less, in a state where the gains thereof exceed 1.0;
generate a first filter signal by convoluting the calculated first filter coefficients of the first FIR filter into the second audio signal;
generate a second filter signal by convoluting the calculated second filter coefficients of the second FIR filter into the first audio signal;
generate the first reference signal by removing components of the first filter signal from the first audio signal;
generate the second reference signal by removing components of the second filter signal from the second audio signal,
wherein the first filter coefficients are expressed by complex numbers by which each frequency component of the second audio signal is to be multiplied respectively in the first FIR filter,
wherein the second filter coefficients are expressed by complex numbers by which each frequency component of the first audio signal is to be multiplied respectively in the second FIR filter, wherein the processor, in calculating the first filter coefficients of the first FIR filter, updates the first filter coefficients of the first FIR filter in a state where a volume ratio of the second audio signal to the first audio signal exceeds a first predetermined threshold, and
wherein the processor, in calculating the second filter coefficients of the second FIR filter, updates the second filter coefficients of the second FIR filter in a state where a volume ratio of the first audio signal to the second audio signal exceeds a second predetermined threshold.

7. The filtering device according to claim 6, wherein the processor is further configured to:
perform first voice recognition processing using the first reference signal; and
perform second voice recognition processing using the second reference signal.

8. The filtering device according to claim 6, wherein the processor is further configured to perform:
first non-linear processing of the first reference signal; and
second non-linear processing of the second reference signal.

9. The filtering device according to claim 6, wherein:
the first filter coefficients of the first FIR filter limit the gain of each frequency component, and
the second filter coefficients of the second FIR filter limit the gain of each frequency component.

10. The filtering device according to claim 6, wherein:
the second audio signal includes a number N of kinds of second audio signals;
the first filter coefficients of the first FIR filter include the same number N of kinds of first filter coefficients; and
the first filter signal is generated by convoluting the number N of kinds of the first filter coefficients into the number N of second audio signals.

11. A non-transitory storage medium storing a program executable by a computer to execute a method comprising:
receiving a first audio signal and a second audio signal, wherein:
the first audio signal represents first sound emitted from a first sound source and second sound emitted from a second sound source, a volume of the first sound from the first sound source being greater than a volume of the second sound from the second sound source in the first audio signal; and
the second audio signal that represents the first sound emitted from the first sound source and the second sound emitted from the second source, the volume of the second sound from the second sound source being greater than the volume of the first sound from the first sound source in the second audio signal;
transforming the first audio signal to a first transformed audio signal with respect to frequency and the second audio signal to a second transformed audio signal with respect to frequency;
calculating first filter coefficients with respect to frequency of a first FIR filter that minimize a level of a first reference signal based on the first and second transformed audio signals, the first FIR filter functioning as a first adaptive filter;
calculating second filter coefficients with respect to frequency of a second FIR filter that minimize a level of a second reference signal based on the first and second transformed audio signals, the second FIR filter functioning as a second adaptive filter;

limiting gains of the calculated first filter coefficients of the first FIR filter for each frequency component to 1.0 or less, in a state where the gains thereof exceed 1.0;

limiting gains of the calculated second filter coefficients of the second FIR filter for each frequency component to 1.0 or less, in a state where the gains thereof exceed 1.0;

generating a first filter signal by convoluting the calculated first filter coefficients of the first FIR filter into the second audio signal;

generating a second filter signal by convoluting the calculated second filter coefficients of the second FIR filter into the first audio signal;

generating the first reference signal by removing components of the first filter signal from the first audio signal;

generating the second reference signal by removing components of the second filter signal from the second audio signal, wherein the first filter coefficients are expressed by complex numbers by which the frequency component of the second audio signal is to be multiplied respectively in the first FIR filter, wherein the second filter coefficients are expressed by complex numbers by which the frequency component of the first audio signal is to be multiplied respectively in the second FIR filter, wherein the calculating of the first filter coefficients of the first FIR filter updates the first filter coefficients of the first FIR filter in a state where a volume ratio of the second audio signal to the first audio signal exceeds a first predetermined threshold, and wherein the calculating of the second filter coefficients of the second FIR filter updates the second filter coefficients of the second FIR filter in a state where a volume ratio of the first audio signal to the second audio signal exceeds a second predetermined threshold.

* * * * *